(12) United States Patent
Iwasaki et al.

(10) Patent No.: US 7,601,445 B2
(45) Date of Patent: Oct. 13, 2009

(54) PERPENDICULAR MAGNETIC RECORDING MEDIUM AND MAGNETIC RECORDING/REPRODUCING APPARATUS

(75) Inventors: Takeshi Iwasaki, Yokohama (JP); Soichi Oikawa, Tokyo (JP); Futoshi Nakamura, Ichikawa (JP); Tomoyuki Maeda, Kawasaki (JP); Hiroshi Sakai, Ichihara (JP); Akira Sakawaki, Ichihara (JP); Kenji Shimizu, Chiba (JP)

(73) Assignees: Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 10/572,780

(22) PCT Filed: Sep. 22, 2004

(86) PCT No.: PCT/JP2004/014300

§ 371 (c)(1),
(2), (4) Date: Mar. 21, 2006

(87) PCT Pub. No.: WO2005/031713

PCT Pub. Date: Apr. 7, 2005

(65) Prior Publication Data

US 2007/0042227 A1    Feb. 22, 2007

Related U.S. Application Data

(60) Provisional application No. 60/507,124, filed on Oct. 1, 2003.

(30) Foreign Application Priority Data

Sep. 25, 2003    (JP) .............................. 2003-333480

(51) Int. Cl.
*G11B 5/65*    (2006.01)

(52) U.S. Cl. .................... 428/836.2; 428/800; 428/826; 428/836

(58) Field of Classification Search ............. 428/836.2, 428/832.1, 832
See application file for complete search history.

(56) References Cited

U.S. PATENT DOCUMENTS

| 6,689,456 | B2 * | 2/2004 | Nakazawa et al. .......... 428/832 |
| 2002/0021627 | A1 | 2/2002 | Hasegawa et al. |
| 2002/0187368 | A1 | 12/2002 | Senzaki et al. |
| 2004/0027868 | A1 | 2/2004 | Nakamura et al. |
| 2005/0058855 | A1 * | 3/2005 | Girt ..................... 428/694 TS |
| 2005/0227122 | A1 * | 10/2005 | Takahashi et al. ........ 428/832.1 |

FOREIGN PATENT DOCUMENTS

| JP | 7-311929 A | 11/1995 |
| JP | 9-204651 A | 8/1997 |
| JP | 2000-15417 A | 1/2000 |
| JP | 2001-351217 A | 12/2001 |
| JP | 2002-342908 A | 11/2002 |
| JP | 2003-217107 A | 7/2003 |

* cited by examiner

*Primary Examiner*—D. Lawrence Tarazano
*Assistant Examiner*—Gary D. Harris
(74) *Attorney, Agent, or Firm*—Sughrue Mion, PLLC

(57) ABSTRACT

To make possible high density recording by making the structure of the perpendicular magnetic recording layer finer. A perpendicular magnetic recording medium 10 includes at least a nonmagnetic under layer 2, a perpendicular magnetic layer 3, and a protective layer which are stacked on a nonmagnetic substrate 1, wherein the perpendicular magnetic layer includes ferromagnetic crystal grains and nonmagnetic crystal grain boundary regions, wherein the crystal grain boundary region includes at least two kinds of oxide.

11 Claims, 10 Drawing Sheets

PERPENDICULAR MAGNETIC RECORDING MEDIUM AND MAGNETIC RECORDING/REPRODUCING APPARATUS

This application is a national stage of PCT application PCT/JP2004/014300 filed on Sep. 22, 2004, claiming priority to Japanese Patent Application No. 2003-333480, filed Sep. 25, 2003 and Provisional Application No. 60/507,124 filed on Oct. 1, 2003, the contents of which are incorporated herein by reference.

TECHNICAL FIELD

The present invention relates to a magnetic recording medium used in a hard disk apparatus and the like using a magnetic recording technology, and to preferable technology used in the magnetic recording/reproducing medium using the magnetic recording/reproducing apparatus.

Priority is claimed on Japanese Patent Application No. 2003-333480, filed Sep. 25, 2003, the content of which is incorporated herein by reference. This application is an application filed under 35 U.S.C. 111(a) claiming pursuant to 35 U.S.C. 119(e) of the filing date of Provisional Application 60/507,124 on Oct. 1, 2003, pursuant to 35 U.S.C. 111(b).

BACKGROUND ART

In the conventional art, a magnetic recording medium using a longitudinal magnetic recording system is well known. On the other hand, in order to respond to the demands for future increases in the recording density of magnetic recording media, a perpendicular magnetic recording system is drawing attention as an alternative system to a longitudinal magnetic recording system. The perpendicular magnetic recording medium is mainly composed of a magnetic recording layer which is magnetized in the nearly perpendicular direction, an under layer which orients the magnetic recording layer perpendicular direction, and a protective layer which protects the surface of the magnetic recording layer. In addition, a soft magnetic undercoat film comprising a soft magnetic material which has a role in concentrating the magnetic flux generated by a magnetic head used for the recording in a magnetic recording layer is optionally additionally provided.

Increase in the recording density is required in perpendicular magnetic recording media as well as in longitudinal magnetic recording media. These are essential to be compatible with the reduction of noise with high thermal fluctuation resistance in order to achieve increase in recording density of the magnetic recording medium. That is, the fine crystal grain size of the magnetic recording layer should be reduced to reduce noise and the magnetic interaction between the magnetic grains should be reduced while increasing the crystal magnetic anisotropy Ku in order to increase the thermal fluctuation resistance.

In order to combine the decrease of noise and high thermal fluctuation resistance, various components, structures, materials and other solutions of a magnetic layer and an under layer were proposed conventionally. In particular, in recent years, a magnetic recording medium using a granular magnetic layer surrounded by a grain boundary region such as nonmagnetic oxides or nitrides are proposed (refer to, for example, Japanese Unexamined Patent Application, First Publication No. Hei 07-311929 and Japanese Unexamined Patent Application, First Publication No. 2002-15417).

The magnetic interaction between the magnetic grains is reduced by segregation of Cr to the grain boundary by producing the conventional Cr segregation type CoCr based alloy magnetic film at high temperature. However, it was difficult to form a grain boundary region of Cr alone by segregating Cr sufficiently from inside magnetic grains since Cr is partially solidly dispersed with Co. On the other hand, in the case of a granular magnetic layer, there is an advantage in that the granular magnetic layer easily segregates nonmagnetic compound which is immiscible with Co more than the conventional film of CoCr based alloy magnetic film does and the isolation of the magnetic grains is accelerated comparatively easily since a nonmagnetic compound which is non-solid-dispersible with Co is used as a grain boundary region.

DISCLOSURE OF INVENTION

In the case of a nonmagnetic compound added to a granular film, some of the compound is often dispersed in magnetic grains by degradation and the deterioration of crystal orientation or magnetic properties of the magnetic recording layer frequently occurs. Because of this, the addition amount of nonmagnetic compound is commonly kept small. On the other hand, further fine crystal grain size of the magnetic recording layer or further decrease of magnetic interaction between the grains is necessary to allow future density increase of magnetic recording media, and in order to do this, it has been necessary to increase the addition amount of nonmagnetic compound without deteriorating crystal orientation or magnetic properties.

The present invention was completed in view of the above circumstances, and the objects below are to be achieved.

The first object of the present invention is to provide a stable crystal grain phase by forming the crystal grain boundary of the magnetic recording layer with at least two kinds of oxide, to reduce noise by reducing the interaction between the magnetic grains, and to obtain a perpendicular magnetic recording medium which can record at higher recording density.

The second object of the present invention is to provide a stable crystal grain boundary region for the magnetic recording layer, to reduce noise by reducing the interaction between the magnetic grains, and to obtain the magnetic recording/reproducing apparatus which can record at higher recording density.

The present invention provides materials and means below. That is, (1) a perpendicular magnetic recording medium comprising at least a nonmagnetic under layer, a magnetic layer, and a protective layer, which are stacked on a nonmagnetic substrate, wherein said magnetic layer includes a ferromagnetic crystal grain and a nonmagnetic crystal grain boundary region, and said crystal grain boundary region comprises at least two kinds of oxide, (2) the perpendicular magnetic recording medium according to the above (1), wherein said oxides which form said crystal grain boundary region are at least two kinds of oxide selected from Y oxides, W oxides, Mg oxides, Al oxides, Zr oxides, Hf oxides, Ti oxides, Ce oxides, Si oxides, Cr oxides, Ni oxides, and Ta oxides, (3) the perpendicular magnetic recording medium according to the above (2), wherein said oxides which form said crystal grain boundary region comprise at least one oxide selected from group A of Y oxides, W oxides, Mg oxides, Al oxides, Zr oxides, and Hf oxides; and at least one oxide selected from group B of Ti oxides, Ce oxides, Si oxides, Cr oxides, Ni oxides, and Ta oxides, (4) the perpendicular magnetic recording medium according to the above (3), wherein the oxide selected from said group A includes at least one oxide selected from Y oxides and W oxides, (5) the perpendicular magnetic recording medium according to one of the above (3) and (4), wherein the oxide selected from said group B includes at least one oxide selected from Si oxides, Cr oxides, and Ta oxides, (6) the perpendicular magnetic recording medium according to one of the above (3) to (5), wherein the content of the oxide selected from the group A in mole percentage is smaller than the content of the oxide selected from the group B in mole percentage in the oxides which form said crystal grain boundary region, (7) the perpendicular magnetic recording medium according to one of the above (3) to (6), wherein the oxygen concentration of the oxide selected from the group B is smaller than the ratio of concentration calculated from the stoichiometric ratio in the oxide which forms said crystal grain boundary region, (8) the perpendicular magnetic recording medium according to one of the above (1) to (7), wherein the oxygen concentration of all oxidizable elements in the crystal grain boundary region is smaller than the concentration of that calculated from the sum of the stoichiometric ratio of all oxides, (9) the perpendicular magnetic recording medium according to one of the above (1) to (8), wherein the magnetic layer includes a total of 0.1 to 30 mol % of the oxides which form said crystal grain boundary region,

(10) the perpendicular magnetic recording medium according to one of the above (1) to (9), wherein the magnetic layer includes a total of 1 to 20 mol % of the oxides which form said grain boundary region.

(11) the perpendicular magnetic recording medium according to one of the above (1) to (10), wherein a crystal grain included in said magnetic layer comprises CoPt alloy as a major component,

(12) the perpendicular magnetic recording medium according to one of the above (1) to (11) wherein said nonmagnetic under layer comprises Ru as a major component,

(13) the perpendicular magnetic recording medium according to one of the above (1) to (12), which has at least one soft magnetic layer between said nonmagnetic substrate and said-nonmagnetic under layer,

(14) a magnetic recording/reproducing apparatus comprising the perpendicular magnetic recording medium according to one of the above (1) to (13), a supporting and rotational driving mechanism of the perpendicular magnetic recording medium, a magnetic head having a device for recording information in said perpendicular magnetic recording medium and a device for reproducing the recorded information, and a carriage-assembly in which said magnetic head is supported freely movable relative to said perpendicular magnetic recording medium.

(15) a magnetic recording/reproducing apparatus according to the above (14), wherein said read/write head is a single magnetic pole recording head.

The present invention first provides a perpendicular magnetic recording medium having a nonmagnetic substrate, at least one layer of a nonmagnetic under layer formed on said nonmagnetic substrate and a magnetic layer (perpendicular magnetic recording layer) having a crystal grain and a crystal grain boundary region which isolate the above crystal grains, wherein said crystal grain boundary region includes at least two kinds of oxide.

The present invention secondly provides a magnetic recording/reproducing apparatus comprising the above perpendicular magnetic recording medium, a mechanism which supports and rotationally drives said perpendicular magnetic recording medium and, a magnetic head which has a device for recording information on said perpendicular magnetic recording medium and a device for reproducing the recorded information, and a carriage-assembly which supports the magnetic head freely movably at the perpendicular magnetic recording medium.

The perpendicular magnetic recording/reproducing apparatus of the present invention has a nonmagnetic substrate, a nonmagnetic under layer, and a magnetic layer, stacked on the nonmagnetic substrate. The magnetic layer includes crystal grains and crystal grain boundary regions which isolate the above crystal grains, and the crystal grain boundary region includes at least two kinds of oxide. The perpendicular recording/reproducing apparatus of the present invention is an apparatus using the above perpendicular magnetic recording medium, and it includes the perpendicular magnetic recording medium and a read/write head.

The magnetic layer (perpendicular magnetic recording layer) in the perpendicular magnetic recording medium of the present invention includes many crystal grains and crystal grain boundary regions which isolate them. In the present invention, at least two kinds of oxide are used as a grain boundary region.

Commonly, when a thin film is deposited on a substrate from a target material of the compound by the deposition method such as by a sputtering method, the target material arrives at the substrate in the atomic state, and then the compound is formed via recombination. In this process, when one kind of oxide is used as a material to form a crystal grain boundary region in a magnetic layer, a part of the oxide is vaporized as oxygen by separating oxygen and a material before oxidizing during the forming of the film, or the oxide is decomposed into atoms in the film, and it is easy for oxygen defects to occur in the compound. By the diffusion of the decomposed atoms, the atoms are taken into the crystal grains and cause the disruption of the crystal orientation or decrease of the crystal magnetic anisotropy energy.

On the other hand, when at least two kinds of oxide are used as a material to form a crystal grain boundary region in a magnetic layer, it is possible for the dispersion from crystal grain boundary regions to crystal grains to hardly occur by donating oxygen from one oxide to the other oxide even if the oxygen defects occur by vaporization or other reason. It is possible to form a firm and stable grain boundary region in the case of forming a grain boundary region by at least two kinds of oxide in comparison to that of forming by one kind. From these phenomena, it is possible to reduce the composition amount of the oxide when a crystal grain boundary region is formed by at least two kinds of oxide in comparison to when it is formed by one kind of oxide.

By using oxides having different standard free energy of oxide formation of metals ($\Delta G^0$) as the at least two kinds of oxide, the reduction reaction from oxide having larger $\Delta G^0$ to oxide having smaller $\Delta G^0$ occurs. At this time, some oxygen defects occur in the oxide having larger $\Delta G^0$; however, the segregation of the oxide from inside of grains to the grain boundary is accelerated by the re-diffusion in the magnetic layer by the energy generated from the reduction reaction.

According to the present invention, there are effects that a sufficient crystal grain boundary region in the magnetic layer by forming the crystal grain boundary region of the magnetic layer (the perpendicular magnetic recording layer) with at least two kinds of oxide can be formed, the diffusion of crystal grain boundary material to the magnetic grain hardly occurs, crystal orientation and magnetic properties of the magnetic layer can be improved, the magnetic grains of the magnetic layer can be made fine, a stable crystal grain boundary region can be provided, noise is reduced by reduction of interaction between magnetic grains, and a perpendicular magnetic recording medium which can record at higher density is obtained.

BEST MODE FOR CARRYING OUT THE INVENTION

The first embodiment according to the present invention is described below based on the figures.

Figure 1:
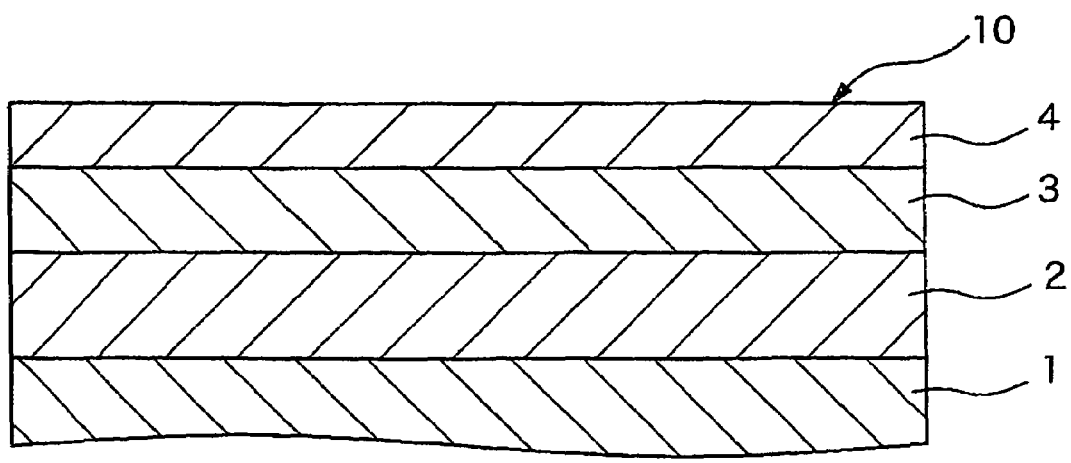
FIG. 1 is a schematic sectional view showing a first embodiment of the perpendicular magnetic recording medium according to the present invention.

FIG. 1 is a schematic sectional view showing an example of the perpendicular magnetic recording medium according to the present embodiment. In the figure, the reference numeral 10 indicates a perpendicular magnetic recording medium.

The perpendicular magnetic recording medium 10 of the present embodiment has a structure in which a nonmagnetic under layer 2, a perpendicular magnetic layer (a perpendicular magnetic recording layer) 3, and protective layer 4 are stacked successively on a nonmagnetic substrate 1 as shown in FIG. 1.

A nonmagnetic substrate 1 may be a glass substrate, an alloy substrate of the aluminum system, a silicon single crystal substrate having an oxidized surface, and a substrate made of ceramic, plastic and other materials. Furthermore, the above nonmagnetic substrates having surfaces coated by NiP alloy and the like may also be applied since the same effects are expected.

At least one under layer including a nonmagnetic under layer 2 between a nonmagnetic substrate 1 and a perpendicular magnetic layer 3. For example, Ru, RuCr, Hf, CoCrPt, and CoCrPtB may be used as an under layer including a nonmagnetic under layer 2.

Preferable thickness of the nonmagnetic under layer 2 used in the present embodiment is equal to or greater than 1 and equal to or less than 50 nm, and more preferably equal to or greater than 1 and equal to or less than 30 nm. When it is less than 1 nm, the crystallinity of the nonmagnetic under layer 2 is inferior, it causes poor crystallinity in the perpendicular magnetic layer (perpendicular magnetic recording layer) 3, and a tendency for increased noise to be observed, and when it is over 50 nm, the magnetic grains of the perpendicular magnetic recording layer 3 become large and the tendency for increased noise is observed.

In order to further improve the crystallinity of the above nonmagnetic under layer 2, an additional under layer (seed layer), which is not shown in the figure, may be used between the nonmagnetic substrate 1 and the above nonmagnetic under layer 2.

For example, Ti, TiCr, Hf, Pt, Pd, NiFe, NiFeMo, NiFeCr, NiAl, NiTa, and NiNb may be used as the seed layer.

The perpendicular magnetic layer (perpendicular magnetic recording layer) 3 is formed from the crystal grain boundary region formed by at least two kinds of oxide and the magnetic crystal grains of which the major component is CoPt alloy. The perpendicular magnetic layer 3 may be stacked in at least 2 layers of magnetic layers having different components. The material comprising a crystal grain of the perpendicular magnetic layer 3 may be a CoPt based alloy, CoCr based alloy, CoCrPt based alloy, CoCrPtB based alloy, CoCrPtTa based alloy, and the like. These alloys have advantages of excellent crystal orientation, large magnetic anisotropy, and excellent thermal fluctuation tolerance.

As materials comprising a crystal grain boundary region of the perpendicular magnetic layer 3, at least two kinds of oxide selected from Y oxides, W oxides, Mg oxides, Al oxides, Zr oxides, Hf oxides, Ti oxides, Ce oxides, Si oxides, Cr oxides, Ni oxides and Ta oxides are preferable. The difference of the standard free energy of oxide formation of metals $\Delta G^0$ occurs due to the redox reaction between the oxides, the dispersion is accelerated by the generated energy, the crystal phase grows, and the magnetic interaction between magnetic grains (crystal) can be reduced.

More preferably, the materials comprising the crystal grain boundary region of the perpendicular magnetic layer 3 may be at least one oxide selected from group A of Y oxides, W oxides, Mg oxides, Al oxides, Zr oxides, and Hf oxides, and at least one oxide selected from group B of Ti oxides, Ce oxides, Si oxides, Cr oxides, Ni oxides, and Ta oxides, and the difference of the standard free energy of oxide formation of metals $\Delta G^0$ becomes large by using the combination of oxides, the redox reaction between oxides occurs easily, the dispersion is accelerated by the generated energy, the crystal grain boundary region grows further, and the magnetic interaction between magnetic grains (between crystal grains) can be reduced.

Furthermore, it is more preferable that the materials comprising the crystal grain boundary region of the perpendicular magnetic layer 3 be constituted by at least one oxide selected from Y oxides and W oxides from group A, and at least one oxide selected from Si oxides, Cr oxides, and Ta oxides from group B. The $\Delta G^0$ of Y and W are small and the reduction action of these are strong, the greater energy generated in the redox reaction is expected. On the other hand, Si, Cr, and Ta have a characteristic that these hardly degrade the magnetic properties even if they are permeate into the magnetic grains by degradation.

By the above redox reaction, the oxides of group B are deoxidized by the oxides of group A, and the deficiency of oxygen in the oxides of group B occurs. As a result, the oxides of group B are lower than the calculated concentration from the stoichiometric ratio.

These redox reactions are more accelerated when some oxygen defects occur to the oxides comprising the crystal grain boundary region at the time of grain boundary region formation in the perpendicular magnetic layer 3.

That is, the redox reaction is accelerated and the dispersion energy can be obtained when the oxygen concentration ratio to all oxidizable elements in the crystal grain boundary region is smaller than that calculated by total of the stoichiometric ratio of all oxides.

Here, the stoichiometric ratio of a compound indicates the component ratio of a composition comprising the target material used in the deposition method such as sputtering. When the reactive sputtering method and the like which forms the oxides by vaporizing the oxidizable materials in an oxygen gas atmosphere, it indicates the chemically most stable component ratio of the element.

As the content (mole percentage) of the oxides forming the crystal grain boundary region in the perpendicular magnetic layer 3, it is preferable that the content (mole percentage) of the oxides selected from the above group A be smaller than the content (mole percentage) of the oxides selected from the group B. When the content of the oxides of group A is too large, the oxides of group B are reduced too much, the materials of group B are dispersed into the magnetic grain, and the crystallinity becomes worse.

The content of the oxides forming the crystal grain boundary region of the perpendicular magnetic layer 3 is preferably equal to or greater than 0.1 and equal to or less than 30 mol % and more preferably equal to greater than 1 and equal to or less than 20 mol %. When the content of the oxides forming the crystal grain boundary region of the perpendicular magnetic layer 3 is less than 0.1 mol %, the forming of the crystal grain boundary region is insufficient and there is a tendency to increase the magnetic interaction of the perpendicular magnetic layer 3, and when it is over 30 mol %, a part of the crystal grain boundary region material disperses into the crystal grain and there is a tendency to decrease the crystal orientation of the perpendicular magnetic layer (perpendicular magnetic recording layer) 3. When the content of the materials (oxides) forming the crystal grain boundary region is within the range of 0.1 to 30 mol %, a sufficient crystal rain boundary region is obtained, the dispersion of the crystal grain boundary region material to the inside of the magnetic grain (crystal) hardly occurs, and the excellent crystal orientation and excellent magnetic properties of the perpendicular magnetic layer 3 are obtained.

Furthermore, in the present embodiment, a lubrication layer, which is not shown in the figures, may be formed by coating a lubricant such as perfluoropolyether on the surface of the obtained perpendicular magnetic recording medium 10, for example, on the surface of perpendicular magnetic layer 3 which is a magnetic recording layer, or on the surface of the protective layer 4 by, for example, a dipping method.

At least one layer of the protective layer 4 may be provided on the perpendicular magnetic layer (perpendicular magnetic recording layer) 3. As the materials of protective layer 4, carbon, diamondlike carbon (DLC), $SiN_x$, $SiO_x$, $CN_x$, and $CH_x$ are exemplified.

In the production of the perpendicular magnetic recording medium 10 of the present embodiment, a depositing method such as a sputtering method as the production method of stacking each layer is applied, and in particular, a single sputtering method using a composite target may be used. A multiple simultaneous sputtering method using targets of each material may also be used.

Since the perpendicular magnetic recording medium 10 of the present embodiment has the above-mentioned constitution and the crystal grain boundary region of the perpendicular magnetic layer (perpendicular magnetic recording layer) 3 is formed by at least two kinds of oxide, a sufficient crystal grain boundary region in the perpendicular magnetic layer is formed, the dispersion of the crystal grain boundary region materials to the magnetic grain hardly occurs, and the excellent crystal orientation of the perpendicular magnetic layer 3, excellent magnetic properties are obtained. For these reasons, the stable crystal grain boundary region is provided, the noise is reduced by reduction of the interaction between the magnetic grains, and the perpendicular magnetic recording medium which can record at higher density is obtained.

The second embodiment according to the present invention is described below based on the figures.

Figure 2:
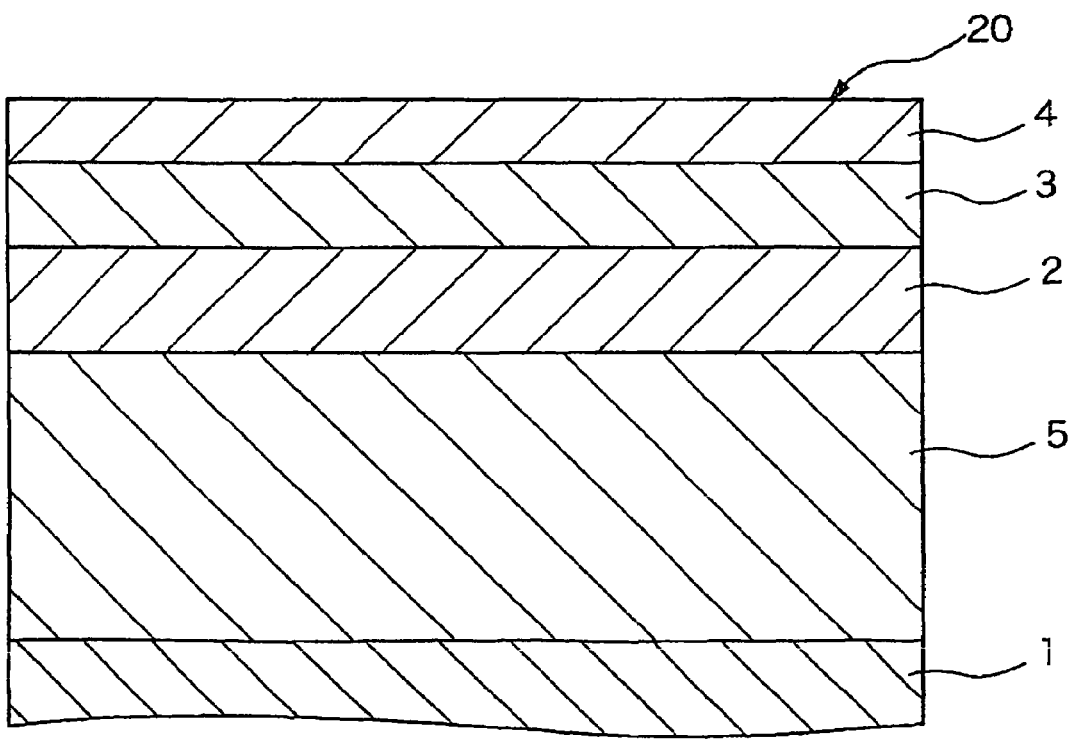
FIG. 2 is a schematic sectional view showing a second embodiment of the perpendicular magnetic recording medium according to the present invention.

FIG. 2 is a schematic sectional view showing an example of the perpendicular magnetic recording medium 20 according to the present embodiment.

In the present embodiment, the difference from the above first embodiment is that a soft magnetic layer 5 is formed between the nonmagnetic substrate 1 and the nonmagnetic under layer 2, and the other corresponding constituent elements are marked with the same reference numerals and the descriptions thereof are omitted.

By providing a soft magnetic layer 5 having high magnetic permeability itself, the perpendicular magnetic recording medium 20 of the present embodiment, what is called a perpendicular double-layer medium having perpendicular magnetic layer perpendicular magnetic recording layer) 3 on the soft magnetic layer 5 is formed. In the perpendicular double-layer medium, the soft magnetic layer 5 has a part of the function of a magnetic head to magnetize the perpendicular magnetic recording layer 3, for example, a magnetic head to reflux the recording magnetic field from a single magnetic pole head to the magnetic head in the horizontal direction, and the soft magnetic layer 5 applies a sufficient and sharp perpendicular magnetic field to the perpendicular magnetic layer (perpendicular magnetic recording layer) 3 which records the magnetic field, and can play a role in improving the recording/reproducing efficiency.

As a soft magnetic material in the soft magnetic layer 5 CoZrNb, CoTaZr, FeCoB, FeCoN, FeTaC, FeTaN, FeNi, FeAlSi and the like may be used which have high saturation magnetic flux density, and excellent soft magnetic properties.

The third embodiment according to the present invention is described below based on the figures.

Figure 3:
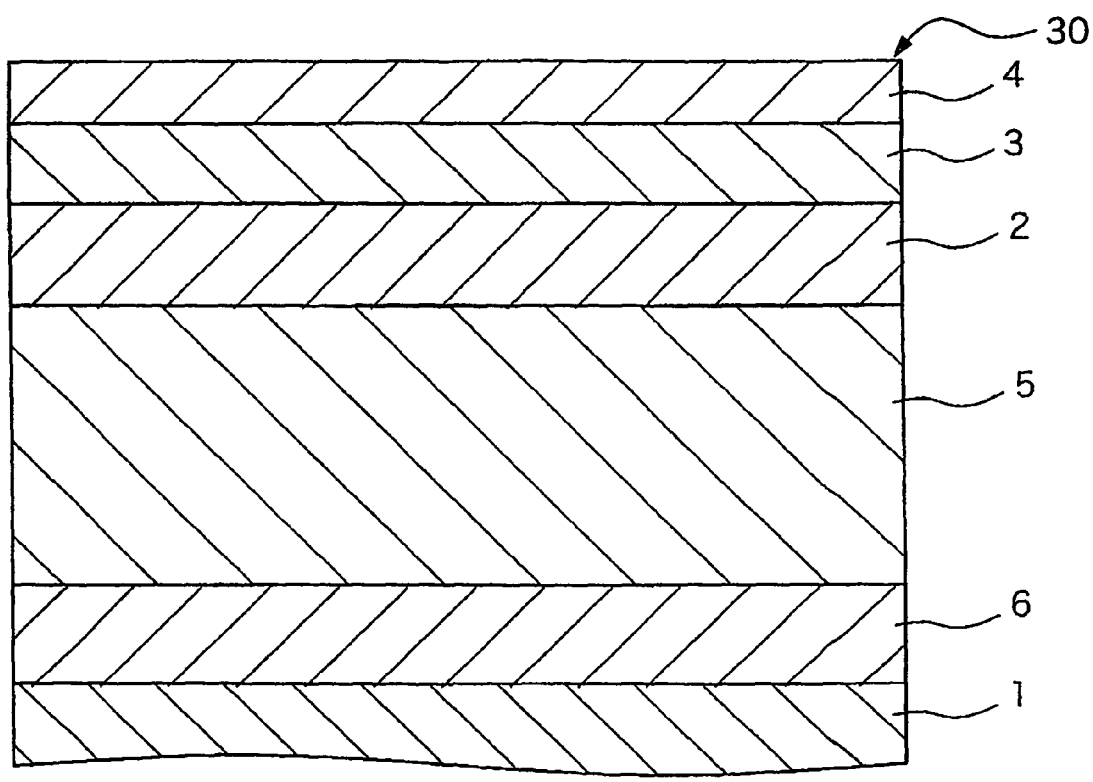
FIG. 3 is a schematic sectional view showing a third embodiment of the perpendicular magnetic recording medium according to the present invention.

FIG. 3 is a schematic sectional view showing an example of the perpendicular magnetic recording medium 30 according to the present embodiment.

In the present embodiment, the difference from the above second embodiment is that a bias applying layer 6 is formed between the nonmagnetic substrate 1 and the soft magnetic layer 5 as shown in FIG. 3, and the other corresponding constituent elements are marked with the same reference numerals, and the descriptions thereof are omitted.

In the perpendicular magnetic recording medium 30 of the present embodiment, a bias applying layer 6 such as an in-plane hard magnetic film or a ferromagnetic layer may be provided between the soft magnetic layer 5 and the nonmagnetic substrate 1 as shown in FIG. 3. The soft magnetic layer 5 easily forms magnetic domains, spike noise is generated from the magnetic domain, and then a magnetic field is applied in one direction radially of the bias applying layer 6, the generation of the magnetic domain wall is prevented by applying the bias magnetic field to the soft magnetic layer 5 formed on it.

It is difficult to form large magnetic domains by dispersing the anisotropy finely of the bias applying layer 6 as a stacked structure.

As a material of the bias applying layer 6, CoCrPt, CoCrPtB, CoCrPtTa, CoCrPtC, CoCrPtCuB, CoCr RuB, CoCr PtWC, CoCrPtWB, CoCrPtTaNd, CoSm, CoPt, CoPtO, CoCrPtO, CoPt—$SiO_2$, and CoCrPtO-$SiO_2$ are exemplified.

Figure 4:
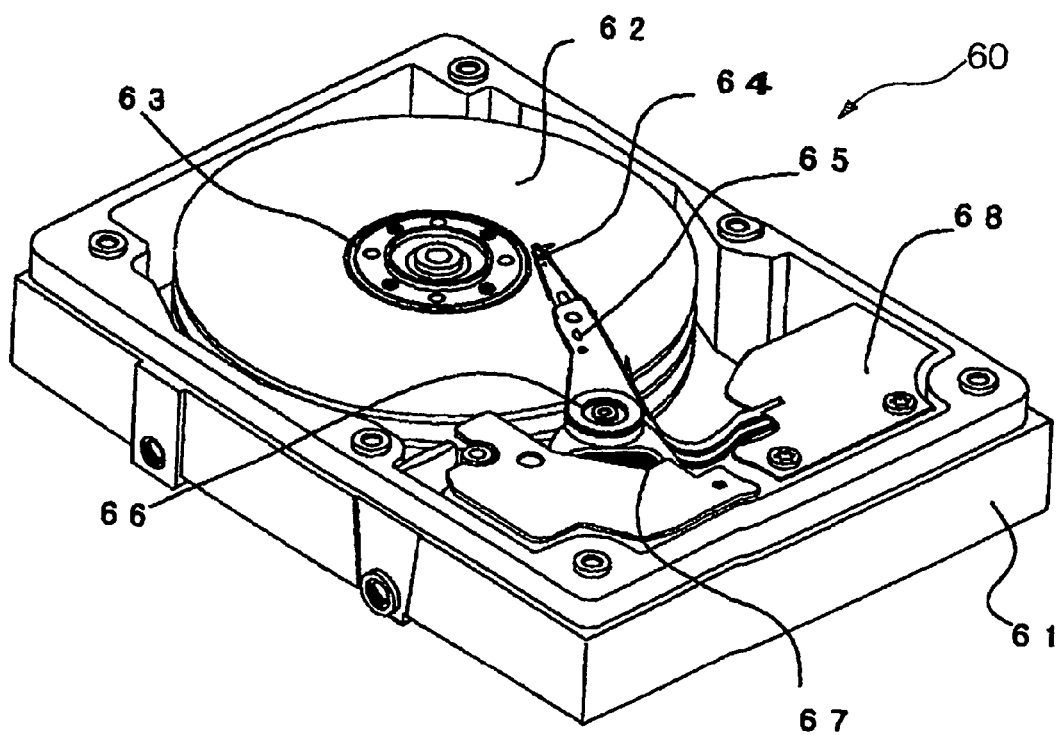
FIG. 4 is a partially exploded perspective-view showing an-example of the perpendicular magnetic recording/reproducing apparatus according to the present invention.

FIG. 4 shows a partially exploded perspective view showing an example of the perpendicular magnetic recording/reproducing apparatus according to the present invention.

As shown in FIG. 4, the perpendicular magnetic recording/reproducing apparatus of the present invention has an open top rectangular box shaped chassis 61 and a top cover which closes the opening of the top of the chassis and which is screwed to the chassis 61 by using multiple screws which are not shown in the figure.

In the chassis 61 are housed a magnetic recording medium 62 using a perpendicular magnetic recording medium 10 of the above-mentioned present embodiment, a spindle motor 63 as a driving means to support and rotate the magnetic recording medium 62, a magnetic head 64 which records and reproduces the magnetic signal in the magnetic recording medium 62, a head actuator 65 which has a suspension mounted the magnetic head 64 at the end and which supports the magnetic head 64 freely movably at the magnetic recording medium 62, a rotary shaft 66 which supports the head actuator 65 freely rotatable, a voice coil motor 67 which rotates and positions the head actuator 65 via the rotational shaft 66, and a head amplifier circuit 68.

As mentioned above, the perpendicular magnetic recording medium 10 according to the present embodiment of the present invention may be used as a magnetic recording medium 62 of the perpendicular magnetic recording/reproducing apparatus 60.

According to the perpendicular magnetic recording/reproducing apparatus of the present embodiment, by using the above perpendicular magnetic recording medium 10, a stable crystal grain boundary region is provided in the perpendicular magnetic recording layer 3, the noise is reduced by reducing the interaction between the magnetic grains, and the magnetic recording/reproducing apparatus can record at higher density.

EXAMPLES

The present invention will be described in detail by giving examples below.

Example 1

A nonmagnetic substrate which was a glass substrate for 2.5 inch magnetic discs was prepared.

The nonmagnetic substrate was placed in a vacuum chamber at $1\times10^{-5}$ Pa degree of vacuum, was heated to 250° C, and was sputtered by DC magnetron sputtering in an Ar atmosphere at a gas pressure of 0.6 Pa.

First, the nonmagnetic substrate was arranged against a target, the electromagnetic radiation of DC 500 W was discharged to the target, a Cr layer was formed at 40 nm thick as an undercoat nonmagnetic film. A CoCrPt ferromagnetic layer was formed at 25 nm thickness on the undercoat nonmagnetic film as a bias applying layer. A 200 nm thick CoZrNb soft magnetic layer was formed on the obtained CoCrPt ferromagnetic layer.

After that, the substrate temperature was reduced to room temperature in the vacuum chamber at $1\times10^{-5}$ Pa degree of vacuum. A NiTa layer was formed 10 nm thick as a nonmagnetic seed layer on the CoZrNb soft magnetic layer by discharging the electromagnetic radiation at DC 500 W using a NiTa target. Next, a Ru layer was formed as a nonmagnetic under layer on the nonmagnetic seed layer by discharging electromagnetic radiation at DC 500 W using a Ru target. A CoPtCr—$Y_2O_3$—$SiO_2$ perpendicular magnetic recording layer is formed 12 nm thick on the Ru under layer by using a composite target of (Co-16 at % Pt-10 at % Cr)-3 mol % $Y_2O_3$-5 mol % $SiO_2$.

Finally, a carbon protective layer was formed which was 7 nm thick.

After the substrate formed in the vacuum chamber was taken out into the atmosphere, a perfluoropolyether series lubricant layer was formed 1.5 nm thick by a dipping method to obtain a perpendicular magnetic recording medium.

Figure 5:
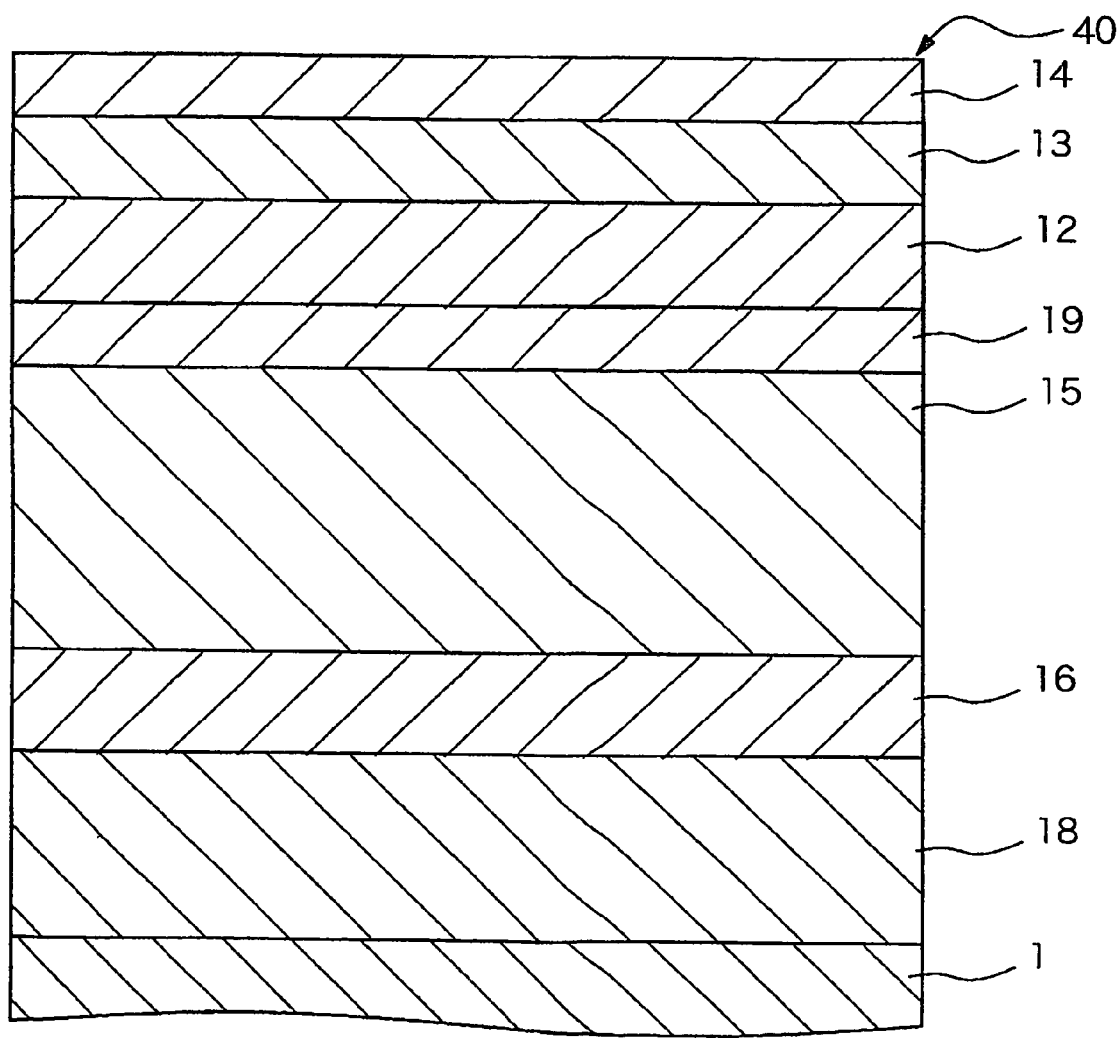
FIG. 5 is a schematic sectional view showing the perpendicular magnetic recording medium according to Examples of the present invention.

FIG. 5 indicates a schematic sectional view showing a constitution of the obtained perpendicular magnetic recording medium.

As shown in the figure, the perpendicular magnetic recording medium 40 has a constitution in which a Cr nonmagnetic layer (undercoat nonmagnetic film) 18, a CoCrPt ferromagnetic layer (bias applying layer) 16, a CoZrNb soft magnetic layer 15, a NiTa seed layer 19, a Ru under layer (nonmagnetic under layer) 12, a CoPtCr—$Y_2O_3$—$SiO_2$ perpendicular magnetic recording layer (perpendicular magnetic layer) 13, a carbon protective layer 14, and a lubricant layer, which is not shown in the figure, were stacked successively on the nonmagnetic substrate 1.

First, the perpendicular recording layer 13 of the obtained perpendicular magnetic recording medium 40 was measured by a transmission electron microscope (TEM) and the grain size distribution of the magnetic grains in the perpendicular magnetic recording layer 13 was measured. From the results, fine Co magnetic grains having a grain size range of 4 to 6 nm and a crystal grain boundary region approximately 1 nm thick were observed.

The distribution of the local element concentration of the perpendicular magnetic recording layer 13 was evaluated by using energy dispersion x-ray spectroscopy using transmission electron microscope (TEM-EDX), and the Co based magnetic crystal grains, of which the major component is Co, and the constitution existing at the crystal grain boundary region of which the major components are Y, Si, and $O_2$ around each Co magnetic crystal grain can be observed.

The magnetic field of 1185 A/m (15000 Oe) was applied to the obtained perpendicular magnetic recording medium 40 radially outside direction of the disk-like substrate by using the magnetizing device having an electromagnet and the ferromagnetic layer of the bias applying layer 16 was magnetized radially in-plane.

The magnetized perpendicular magnetic recording medium 40 was evaluated for the read and write properties by the read/write analyzer 1632 and the spin stand S1701MP manufactured by Guzik Technical Enterprises of the United States.

The read and write head used a head having a 0.25 μm recording track width and 0.15 μm reproducing track width in which the single magnetic pole is used for the recording part and the magnetoresistance effect is used for the reproducing device. The measurement rotational speed of the disk was 4200 rpm and at 22.2 mm of radius from the center of the given position.

From these results, an excellent medium SNRm (outputs of reproducing signals S:output of at linear recording density 119 kFCI, Nm:rms value (root mean square) at 716 kFCI) was obtained at 23.8 dB.

Comparative Example 1

As a perpendicular magnetic recording medium of a comparative example, a perpendicular magnetic recording medium was obtained according to the same procedure as that for the perpendicular magnetic recording medium 40 of the above Example 1 except for forming the CoPtCr—$SiO_2$ layer as a perpendicular magnetic recording layer 12 nm thick by using a composite target of (Co-16 at % Pt-10 at % Cr)-8 mol % $SiO_2$.

The obtained perpendicular magnetic recording medium of the Comparative Example 1 had the same layer constitution as the perpendicular magnetic recording medium shown in FIG. 5 except that the perpendicular recording layer is different.

The perpendicular magnetic recording layer of the perpendicular magnetic recording medium obtained as the Comparative Example 1 was measured by TEM and grain size distribution of the magnetic grains of the perpendicular magnetic recording layer was examined. As a result, the grain size range was equal to or greater than 7 and equal to or less than 10 nm.

When the recording/reproducing properties of the perpendicular magnetic recording medium of Comparative Example 1 were evaluated in a manner similar to that of Example 1, SNRm was 18.5 dB.

It may be seen that the medium of the Example 1 using two types of oxide in the present invention showed better properties than the conventional medium of Comparative Example 1 using one type of oxide as a grain boundary forming phase.

Example 2

As a perpendicular magnetic recording layer of Example 2, the perpendicular magnetic recording medium was formed by the same procedure as for Example 1 except for using various oxides in composite targets which were a Co-16 at % Pt-10 at % Cr and a CoPtCr-4 mol % A-4 mol % B composite target (wherein A represents at least one selected from $Y_2O_3$, $WO_3$, MgO, $Al_2O_3$, $ZrO_2$, $HfO_2$ and B represents at least one selected from $TiO_2$, $CeO_2$, $SiO_2$, $Cr_2O_3$, NiO, $Ta_2O_5$) having the combination of oxides of various elements shown in the following Table 1 instead of using a CoPtCr-3 mol % $Y_2O_3$-5 mol % SiO2 composite target.

The obtained perpendicular magnetic recording medium has the same layer constitution as the perpendicular magnetic recording medium shown in FIG. 5 except that the perpendicular magnetic recording layer is different.

The obtained perpendicular magnetic recording medium was evaluated for the recording/reproducing properties in the same way as in Example 1. The results are shown in Table 1.

TABLE 1

| Group A | Group B | SNRm (dB) | Group A | Group B | SNRm (dB) |
|---|---|---|---|---|---|
| $Y_2O_3$ | $TiO_2$ | 22.5 | $Al_2O_3$ | $TiO_2$ | 21.6 |
| $Y_2O_3$ | $CeO_2$ | 22.0 | $Al_2O_3$ | $CeO_2$ | 21.3 |
| $Y_2O_3$ | $SiO_2$ | 23.7 | $Al_2O_3$ | $SiO_2$ | 22.2 |
| $Y_2O_3$ | $Cr_2O_3$ | 23.5 | $Al_2O_3$ | $Cr_2O_3$ | 22.1 |
| $Y_2O_3$ | NiO | 22.6 | $Al_2O_3$ | NiO | 21.9 |
| $Y_2O_3$ | $Ta_2O_5$ | 23.6 | $Al_2O_3$ | $Ta_2O_5$ | 22.8 |
| $WO_3$ | $TiO_2$ | 22.1 | $ZrO_2$ | $TiO_2$ | 21.8 |
| $WO_3$ | $CeO_2$ | 22.5 | $ZrO_2$ | $CeO_2$ | 22.0 |
| $WO_3$ | $SiO_2$ | 23.3 | $ZrO_2$ | $SiO_2$ | 22.5 |
| $WO_3$ | $Cr_2O_3$ | 23.5 | $ZrO_2$ | $Cr_2O_3$ | 22.2 |
| $WO_3$ | NiO | 22.8 | $ZrO_2$ | NiO | 21.1 |
| $WO_3$ | $Ta_2O_5$ | 23.2 | $ZrO_2$ | $Ta_2O_5$ | 22.1 |
| MgO | $TiO_2$ | 21.4 | $HfO_2$ | $TiO_2$ | 21.8 |
| MgO | $CeO_2$ | 21.9 | $HfO_2$ | $CeO_2$ | 21.3 |
| MgO | $SiO_2$ | 22.6 | $HfO_2$ | $SiO_2$ | 22.6 |
| MgO | $Cr_2O_3$ | 22.7 | $HfO_2$ | $Cr_2O_3$ | 22.7 |
| MgO | NiO | 21.8 | $HfO_2$ | NiO | 21.6 |
| MgO | $Ta_2O_5$ | 22.3 | $HfO_2$ | $Ta_2O_5$ | 22.2 |
| Medium of Comparative Example $SiO_2$ | — | 18.5 | Medium of Comparative Example $SiO_2$ | — | 18.5 |

From the results of Table 1, it may be seen that the medium using at least one oxide selected from Y oxides, W oxides, Mg oxides, Al oxides, Zr oxides, and Hf oxides as group A and at least one oxide selected from Ti oxides, Ce oxides, Si oxides, Cr oxides, Ni oxides, and Ta oxides as group B showed better properties than the conventional medium of Comparative Example 1.

Example 3

As the perpendicular magnetic recording layer of Example 3, the perpendicular magnetic recording medium was formed in the same way as in Example 1 except using the oxides composite target having various composition ratios which were a CoPtCr-x mol % A-y mol % B composite target (wherein A represents at least one selected from $Y_2O_3$ and $WO_3$, and B represents at least one selected from $SiO_2$, $Cr_2O_3$, $Ta_2O_5$) having various composition ratios shown in the following Table 2 instead of using a CoPtCr-3 mol % $Y_2O_3$-5 mol % $SiO_2$ composite target.

The obtained perpendicular magnetic recording medium has the same layer constitution as the perpendicular magnetic recording medium shown in FIG. 5, except that the perpendicular magnetic recording layer is different.

The obtained perpendicular recording medium of Example 3 was evaluated for the recording/reproducing properties in the same way as in Example 1.

FIGS. 6 to 11 are graphs showing the relation between the content of the grain boundary region forming material of a CoPtCr-x mol % A-y mol % B (A represents at least one selected from $Y_2O_3$ and $WO_3$, and B represents at least one selected from $SiO_2$, $Cr_2O_3$, and $Ta_2O_5$) perpendicular magnetic recording layer and SNRm.

Figure 6:
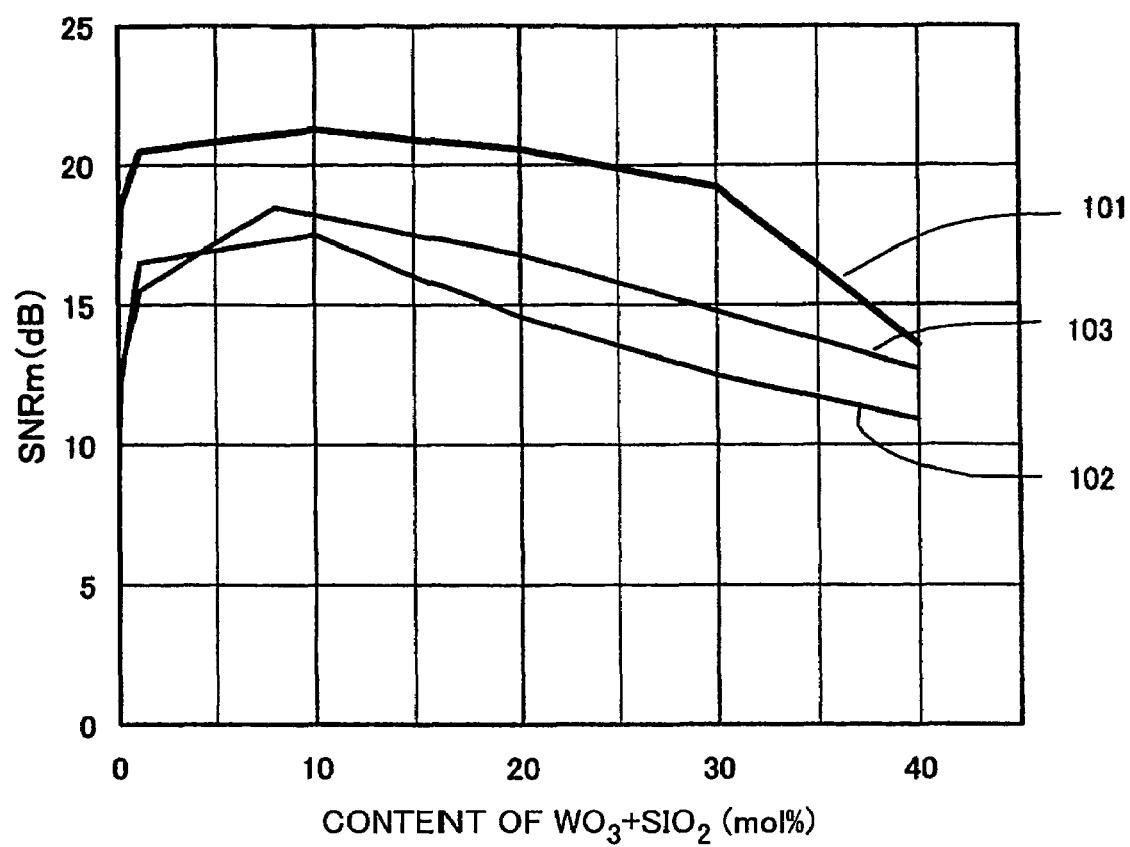
FIG. 6 is a graph showing the relationship between the content of grain boundary region forming materials of CoPtCr-x mol % $WO_3$-y mol % $SiO_2$ perpendicular magnetic recording layer and SNRm.
Figure 7:
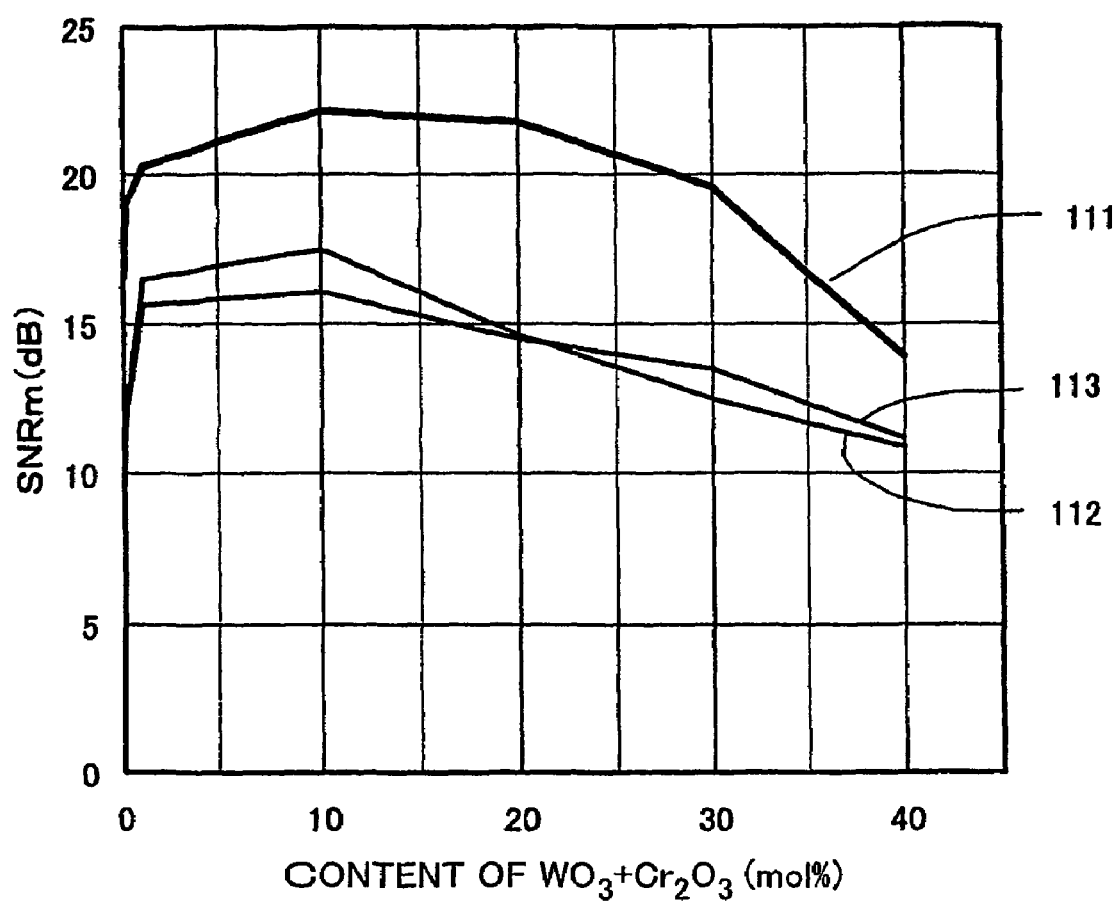
FIG. 7 is a graph showing the relationship between the content of grain boundary region forming materials of CoPtCr-x mol % $WO_3$-y mol % $Cr_2O_3$ perpendicular magnetic recording layer and SNRm.
Figure 8:
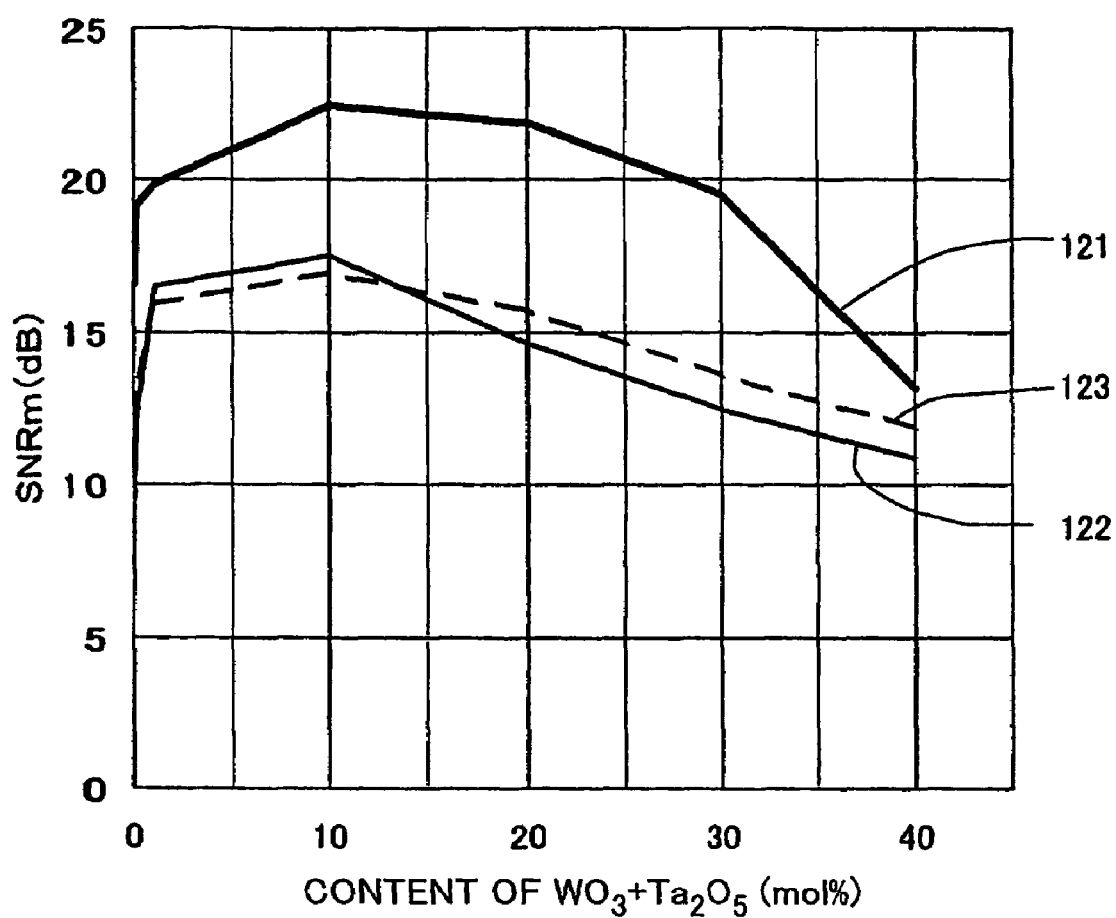
FIG. 8 is a graph showing the relationship between the content of grain boundary region forming materials of CoPtCr-x mol % $WO_3$-y mol % $Ta_2O_5$ perpendicular magnetic recording layer and SNRm.

FIGS. 6 to 8 are graphs showing curves 101, 111, and 121 respectively when the grain boundary region forming materials were A=$WO_3$, B represents at least one selected from $SiO_2$, $Cr_2O_3$, and $Ta_2O_5$, and the composition was x=y=z/2 (0=z=40 mol %).

FIGS. 6 to 8 are graphs showing curves 102, 112, and 122 respectively when the grain boundary region forming materials was $WO_3$ only, that is, the composition was x=z, y=0 (0=z=40mol %).

Furthermore, FIGS. 6 to 8 are graphs showing curves 103, 113, and 123 respectively when the grain boundary region forming materials was $SiO_2$, $Cr_2O_3$, or $Ta_2O_5$ only, the composition was x=0, y=z (0=z=40 mol %).

As is clear from comparison thereof, it may be seen that the case which two types of oxide are used as shown in curves 101, 111, and 121 in FIGS. 6 to 8 was better in SNRm than that using one type of oxide as shown in curves 102, 112 and 122, and curves 103, 113, and 123 shown in FIGS. 6 to 8.

Figure 9:
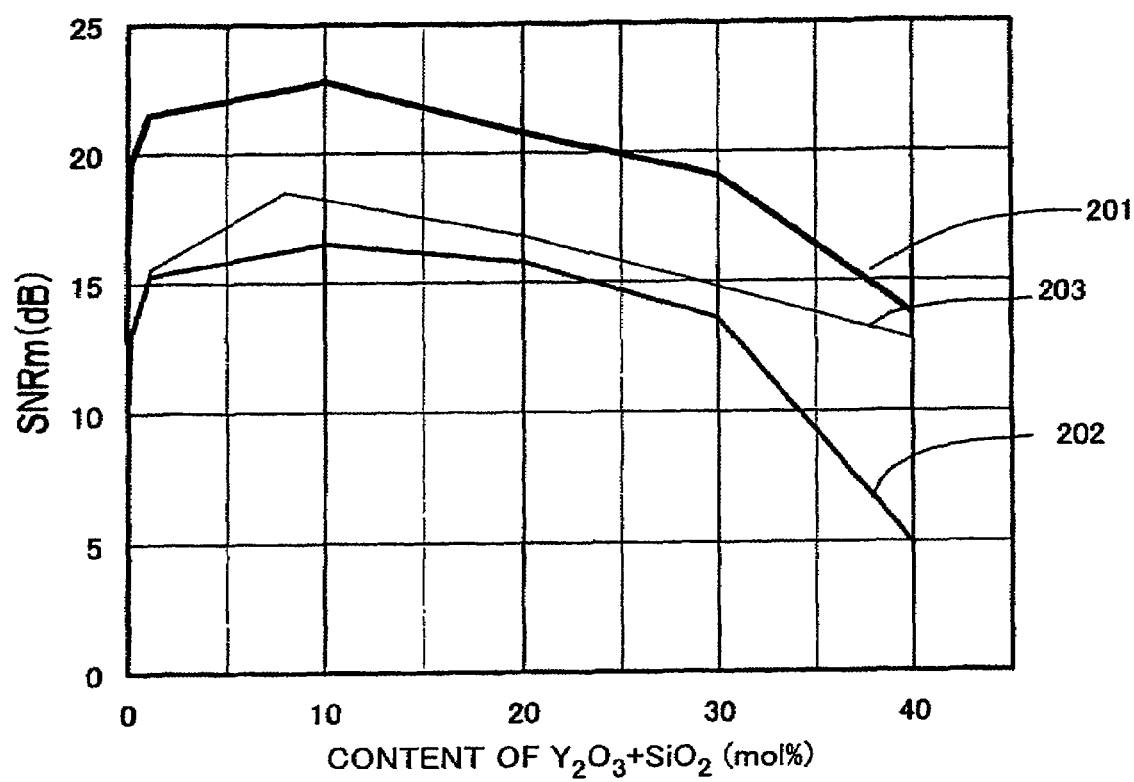
FIG. 9 is a graph showing the relationship between the content of grain boundary region forming materials of CoPtCr-x mol % $Y_2O_3$-y mol % $SiO_2$ perpendicular magnetic recording layer and SNRm.
Figure 10:
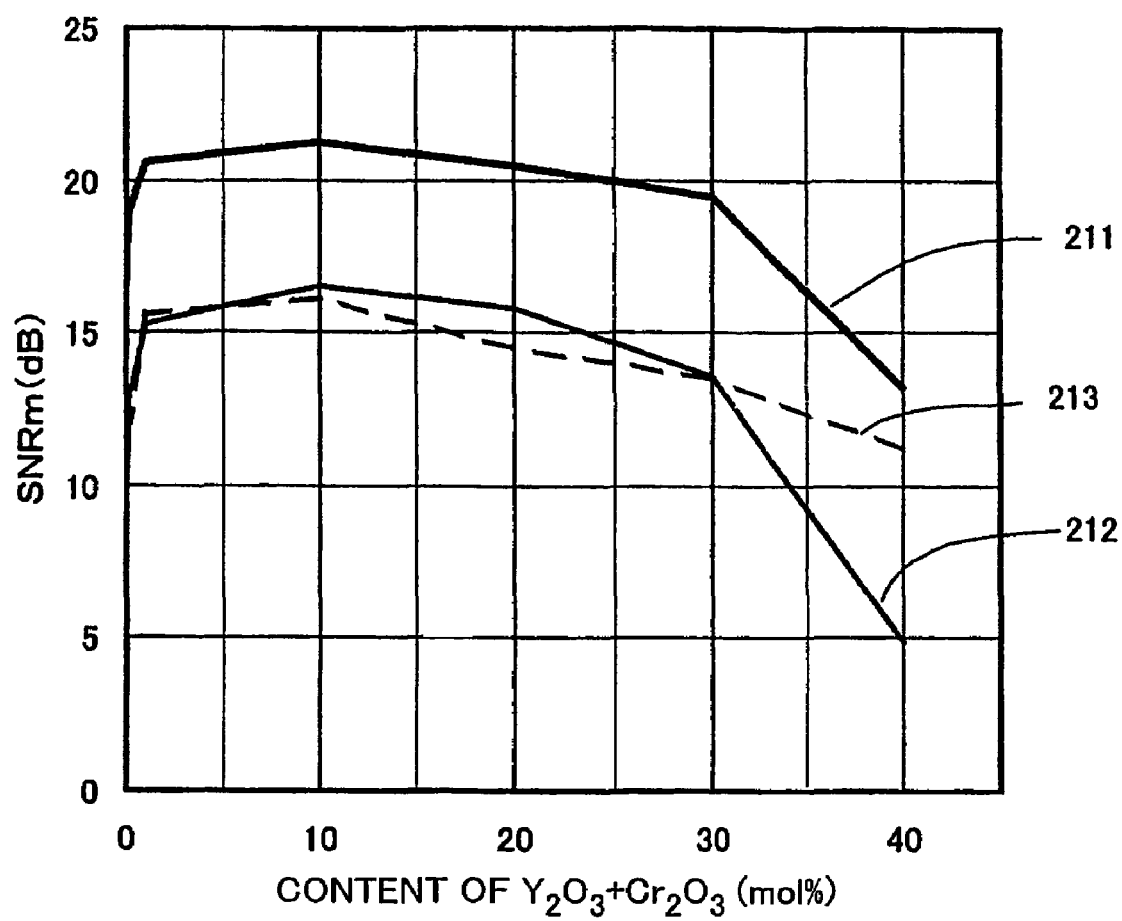
FIG. 10 is a graph showing the relationship between the content of grain boundary region forming materials of CoPtCr-x mol % $Y_2O_3$-y mol % $Cr_2O_3$ perpendicular magnetic recording layer and SNRm.
Figure 11:
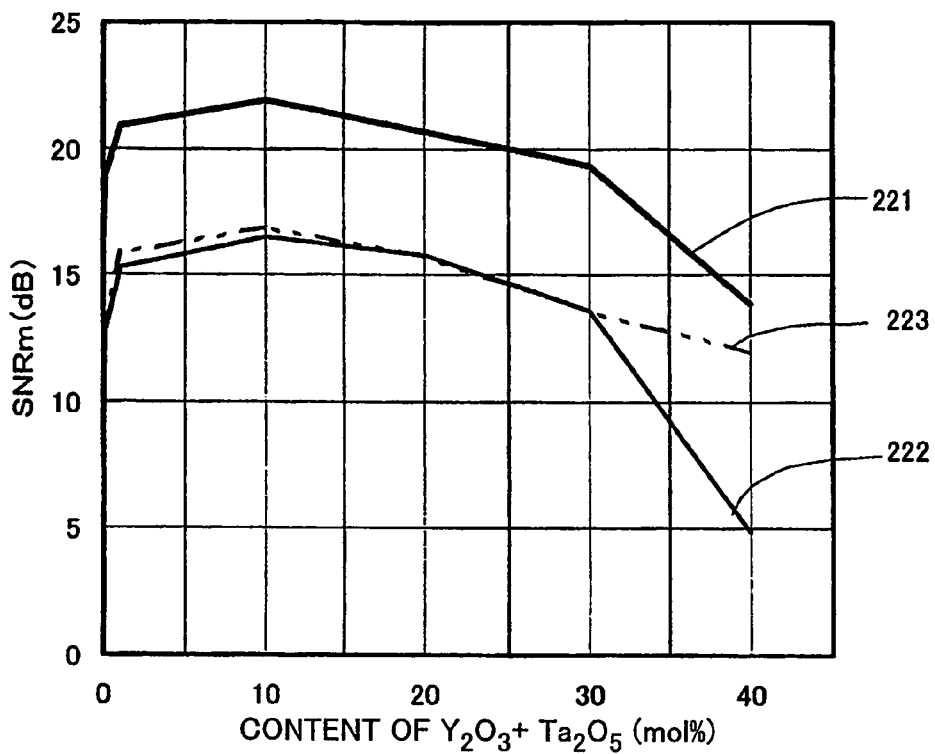
FIG. 11 is a graph showing the relationship between the content of grain boundary region forming materials of CoPtCr-x mol % $Y_2O_3$-y mol % $Ta_2O_5$ perpendicular magnetic recording layer and SNRm.

In the same way, FIGS. 9 to 11 are graphs showing curves 201, 211, and 221 respectively when the grain boundary region forming materials were A=$Y_2O_3$, B is selected from at least one from $SiO_2$, $Cr_2O_3$ and $Ta_2O_5$ and the composition was x=y=z/2 (0=z=40 mol %).

FIGS. 9 to 11 are graphs showing the curves 202, 212, and 222 respectively when the grain boundary region forming material was $Y_2O_3$ alone, that is, the composition was x=z, y=0(0=z=40 mol %).

Furthermore, FIGS. 9 to 11 are graphs showing curves 203, 213, and 223 respectively when the grain boundary region forming materials was $SiO_2$, $Cr_2O_3$ or $Ta_2O_5$ alone, that is the composition was x=0, y=z (0=z=40 mol %).

As is clear from comparisons thereof, the case in which two kinds of oxide were used as shown in curves 201, 211, and 221 indicated in FIGS. 9 to 11 was better in SNRm than that using one kind of oxide as shown in curves 202, 212, and 222, and curves 203, 213, and 223 indicated in FIGS. 9 to 11.

From FIGS. 6 to 11, it may be seen that when the contents of the grain boundary region forming materials were equal to or greater than 0.1 and equal to or less than 30 mol % in total, better properties were exhibited. When the content of the grain boundary region forming materials were equal to or greater than 1 and equal to or less than 20 mol %, even better properties were exhibited.

Example 4

For the perpendicular magnetic recording layer of Example 4, the perpendicular magnetic recording medium was formed using the same procedure as in Example 1 except for using the various oxide composite targets which were a CoPtCr-x mol % A-y mol % B composite target (wherein A represents at least one selected from $Y_2O_3$ and $WO_3$ and B represents at least one selected from $SiO_2$, $Cr_2O_3$, $Ta_2O_5$) having various composition ratios shown in Table 2 instead of using a CoPtCr-3 mol % $Y_2O_3$-5 mol % $SiO_2$ composite target.

The obtained perpendicular magnetic recording medium had the same layer constitution as the perpendicular magnetic recording medium shown in FIG. 5 except that the perpendicular magnetic recording layer was different.

When distribution of the local element concentration by using TEM-EDX was evaluated in the perpendicular magnetic recording medium obtained in FIG. 4, the Co based magnetic crystal grains having major component of Co and the constitution in the crystal grain boundary region having a major component of Y, W, Si, Cr, Ta and $O_2$ around each Co based magnetic crystal grain was confirmed.

The peaks of oxides and peaks of the oxidizable materials (elemental substances) were measured by X-ray photoelectron spectroscopy analysis in the magnetic recording medium obtained in Example 4.

As these results, it may be seen that Y, W, Si, Cr, and Ta existed at the stoichiometric ratio of $Y_2O_3$, $WO_3$, $SiO_2$, $Cr_2O_3$, and $Ta_2O_5$. On the other hand, when the peaks of group B (Si, Cr, and Ta) were measured, it may be seen that the peak integrated intensity of these oxides were weak in comparison to that of group A (Y, W, and other materials) and the peak integrated intensity of oxidizable materials (elemental substances) was strong. This indicates that some of the oxides of group B are reduced by the oxides of group A. From the above description, it may be seen that the oxygen concentration of the crystal grain boundary region was reduced from the ratio of concentration calculated by the stoichiometric ratio of oxides.

The obtained perpendicular recording medium of Example 4 was evaluated in the recording/reproducing properties in the same way as in Example 1. The results are shown in Table 2.

TABLE 2

| Group A | mol % | Group B | mol % | SNRm (dB) |
|---|---|---|---|---|
| $WO_3$ | 3 | $SiO_2$ | 7 | 23.1 |
| $WO_3$ | 5 | $SiO_2$ | 5 | 21.3 |
| $WO_3$ | 7 | $SiO_2$ | 3 | 20.1 |
| $WO_3$ | 3 | $Cr_2O_3$ | 7 | 22.9 |
| $WO_3$ | 5 | $Cr_2O_3$ | 5 | 22.2 |
| $WO_3$ | 7 | $Cr_2O_3$ | 3 | 19.5 |
| $WO_3$ | 3 | $Ta_2O_5$ | 7 | 23.3 |
| $WO_3$ | 5 | $Ta_2O_5$ | 5 | 22.5 |
| $WO_3$ | 7 | $Ta_2O_5$ | 3 | 20.4 |
| $Y_2O_3$ | 3 | $SiO_2$ | 7 | 23.3 |
| $Y_2O_3$ | 5 | $SiO_2$ | 5 | 22.8 |
| $Y_2O_3$ | 7 | $SiO_2$ | 3 | 19.6 |
| $Y_2O_3$ | 3 | $Cr_2O_3$ | 7 | 22.8 |
| $Y_2O_3$ | 5 | $Cr_2O_3$ | 5 | 21.3 |
| $Y_2O_3$ | 7 | $Cr_2O_3$ | 3 | 19.7 |
| $Y_2O_3$ | 3 | $Ta_2O_5$ | 7 | 23.3 |
| $Y_2O_3$ | 5 | $Ta_2O_5$ | 5 | 21.9 |
| $Y_2O_3$ | 7 | $Ta_2O_5$ | 3 | 20.0 |
| — | — | $SiO_2$ | 10 | 18.2 |
| — | — | $Cr_2O_3$ | 10 | 16.1 |
| — | — | $Ta_2O_5$ | 10 | 16.9 |
| $WO_3$ | 10 | — | — | 17.5 |
| $Y_2O_3$ | 10 | — | — | 16.5 |

As is clear from the results of Table 2, when oxides are used at various composition ratios, and when the amount of oxides of group B is larger than that of group A, better properties were exhibited. In particular, the reduction of oxygen concentration in oxides of group B in comparison to that of group A can be seen when the crystal grain boundary is formed in combination of group A and group B.

Example 5

As the perpendicular magnetic recording layer of Example 5, the perpendicular magnetic recording medium was formed in the same way as in Example 1 except for using the various oxide composite targets which were a CoPtCr-a mol % A-b mol % B-c mol % C-d mol % D-e mol % E composite target (wherein A represents at least one selected from $Y_2O_3$, $WO_3$, MgO, $Al_2O_3$, $ZrO_2$, and $HfO_2$, and B=$SiO_2$, C=$Cr_2O_3$, D=$Ta_2O_5$, E=$CeO_2$, and a=b=c=2 mol %, d=0 and 2 mol %, and e=0 and 2 mol %) having various grain boundary region constituents shown in Table 3 instead of using a CoPtCr-3 mol % $Y_2O_3$-5 mol % $SiO_2$ composite target.

Comparative Example 2

Next, for comparison, as the perpendicular magnetic recording medium of Comparative Example 2, a perpendicular magnetic recording medium was formed in the same way as that for the perpendicular magnetic recording medium of Example 1 except that a 12 nm thick layer of CoPtCr—$SiO_2$ was formed as a perpendicular magnetic recording layer using the (Co-16 at % Pt-10 at % Cr)-x mol % $SiO_2$ (wherein x=6, 8, and 10 mol %) composite target.

The perpendicular magnetic recording medium of Example 5 and the perpendicular magnetic recording medium of Comparative Example 2 have the same layer constitution as the perpendicular magnetic recording medium shown in FIG. 5 except that the perpendicular magnetic recording layer is different.

The perpendicular magnetic recording medium obtained in Example 5 and the perpendicular magnetic recording medium of Comparative Example 2 were evaluated the recording/reproducing properties in the same way as in Example 1. The results are shown in Table 3.

TABLE 3

| A | B | C | D | E | SNRm (dB) |
|---|---|---|---|---|---|
| $Y_2O_3$ | $SiO_2$ | $Cr_2O_3$ | — | — | 21.8 |
| $WO_3$ | $SiO_2$ | $Cr_2O_3$ | — | — | 21.9 |
| MgO | $SiO_2$ | $Cr_2O_3$ | — | — | 21.7 |
| $Al_2O_3$ | $SiO_2$ | $Cr_2O_3$ | — | — | 21.4 |
| $ZrO_2$ | $SiO_2$ | $Cr_2O_3$ | — | — | 21.3 |
| $HfO_2$ | $SiO_2$ | $Cr_2O_3$ | — | — | 21.8 |
| $Y_2O_3$ | $SiO_2$ | $Cr_2O_3$ | $Ta_2O_5$ | — | 21.7 |
| $WO_3$ | $SiO_2$ | $Cr_2O_3$ | $Ta_2O_5$ | — | 21.8 |
| MgO | $SiO_2$ | $Cr_2O_3$ | $Ta_2O_5$ | — | 20.5 |
| $Al_2O_3$ | $SiO_2$ | $Cr_2O_3$ | $Ta_2O_5$ | — | 20.9 |
| $ZrO_2$ | $SiO_2$ | $Cr_2O_3$ | $Ta_2O_5$ | — | 20.1 |
| $HfO_2$ | $SiO_2$ | $Cr_2O_3$ | $Ta_2O_5$ | — | 21.1 |
| $Y_2O_3$ | $SiO_2$ | $Cr_2O_3$ | $Ta_2O_5$ | $CeO_2$ | 21.6 |
| $WO_3$ | $SiO_2$ | $Cr_2O_3$ | $Ta_2O_5$ | $CeO_2$ | 21.5 |
| MgO | $SiO_2$ | $Cr_2O_3$ | $Ta_2O_5$ | $CeO_2$ | 21.1 |
| $Al_2O_3$ | $SiO_2$ | $Cr_2O_3$ | $Ta_2O_5$ | $CeO_2$ | 20.7 |
| $ZrO_2$ | $SiO_2$ | $Cr_2O_3$ | $Ta_2O_5$ | $CeO_2$ | 20.2 |
| $HfO_2$ | $SiO_2$ | $Cr_2O_3$ | $Ta_2O_5$ | $CeO_2$ | 20.7 |
| 6 mol % $SiO_2$ | — | — | — | — | 17.9 |
| 8 mol % $SiO_2$ | — | — | — | — | 18.5 |
| 10 mol % $SiO_2$ | — | — | — | — | 18.2 |

As is clear from the results of Table 3, the case in which at least three kinds of oxide are used as a grain boundary forming phase in comparison to when only one kind of oxide was used exhibited better properties.

Example 6

As the perpendicular magnetic recording medium of Example 6, the perpendicular magnetic recording medium was formed using the same procedure as Example 1 except that the Cr nonmagnetic layer, the CoCrPt ferromagnetic layer, and CoZrNb soft magnetic layer was not formed.

Figure 12:
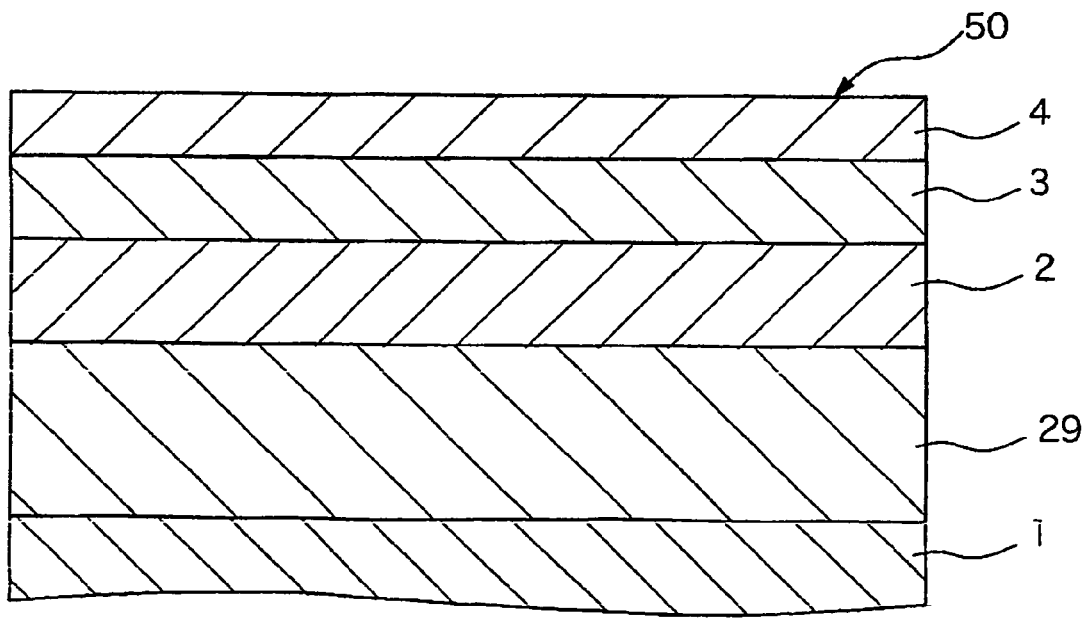
FIG. 12 is a schematic sectional view showing the perpendicular magnetic recording medium according to the Examples of the present invention.

In FIG. 12, a schematic sectional view showing a further alternative example of the perpendicular magnetic recording medium according to the present invention.

As shown in FIG. 12, the perpendicular magnetic recording medium 50 of Example 6 has a constitution in which a NiTa seed layer 29, a Ru under layer 2, a CoPtCr—$Y_2O_3$—$SiO_2$ perpendicular magnetic recording layer 3, a carbon protective layer 4, and a lubricant layer, which are not shown in the figure, are stacked on a nonmagnetic substrate 1.

The perpendicular magnetic recording medium obtained in Example 6 was measured by TEM in the same way as in Example 1. As a result, it may be seen that the perpendicular magnetic recording layer had a grain size range equal to or greater than 5 and equal to or less than 7 nm.

The perpendicular magnetic recording medium was evaluated the recording/reproducing properties by using a ring type head of 0.25 μm recording track width and 0.15 μm reproducing track width using the magnetoresistance effect, and the SNRm was 21.5 dB.

Comparative Example 3

As the perpendicular magnetic layer of Comparative Example 3, a comparative perpendicular magnetic recording medium was obtained in the same way in Example 5 except that a CoPtCr—$SiO_2$ perpendicular magnetic layer was formed 12 nm thick by using a CoPtCr—$SiO_2$ target.

The obtained perpendicular magnetic recording medium has the same layer constitution as in FIG. 12 except that the perpendicular magnetic layer is different.

The obtained perpendicular magnetic recording medium was measured by TEM as the same way as in Example 6. As a result, it may be seen that the perpendicular magnetic recording layer had grain size range of equal to or greater than 9 and equal to or less than 12 nm.

The perpendicular magnetic recording medium was evaluated the recording/reproducing properties by using a ring type head of 0.25 μm recording track width and 0.15 μm reproducing track width by using the magnetoresistance effect, and the SNRm was 16.8 dB.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

An application example of the present invention is one in which the perpendicular magnetic recording medium of the present invention can apply to a magnetic recording/reproducing apparatus having excellent outputs of reproducing signals and linear recording density on some level of 0.25 μm and 0.15 μm magnetic track width.

The invention claimed is:

1. A perpendicular magnetic recording medium comprising at least
a nonmagnetic under layer,
a magnetic layer, and
a protective layer stacked on a nonmagnetic substrate, wherein
said magnetic layer includes a ferromagnetic crystal grain and a nonmagnetic grain boundary region;
said magnetic layer comprises a total of 0.1 to 30 mol % of oxides which form said crystal grain boundary region;
said oxides which form said crystal grain boundary region comprises:
at least one oxide selected from group A of Y oxides, W oxides, Mg oxides, Al oxides, Zr oxides, and Hf oxides; and at least one oxide selected from group B of Ti oxides, Ce oxides, Si oxides, Cr oxides, Ni oxides, and Ta oxides; and the content of the oxide selected from the group A in mole percentage is smaller than the content of the oxide selected from the group B in mole percentage in the oxides which form said crystal grain boundary region.

2. The perpendicular magnetic recording medium according to claim 1, wherein the oxide selected from said group A includes at least one oxide selected from Y oxides and W oxides.

3. The perpendicular magnetic recording medium according to claim 1, wherein the oxide selected from said group B includes at least one oxide selected from Si oxides, Cr oxides, and Ta oxides.

4. The perpendicular magnetic recording medium according to claim 1, wherein oxygen concentration of the oxide selected from the group B is smaller than ratio of concentration calculated from the stoichiometric ratio in the oxides which form said crystal grain boundary region.

5. The perpendicular magnetic recording medium according to claim 1, wherein oxygen concentration to all oxidizable elements in the crystal grain boundary region is smaller than the concentration of that calculated from the sum of the stoichiometric ratio of all oxides.

6. The perpendicular magnetic recording medium according to claim 1, wherein the magnetic layer includes a total of 1 to 20 mol % of the oxides which form said crystal grain boundary region.

7. The perpendicular magnetic recording medium according to claim 1, wherein a crystal grain included in said magnetic layer comprises CoPt alloy as a major component.

8. The perpendicular magnetic recording medium according to claim 1, wherein said nonmagnetic under layer comprises Ru as a major component.

9. The perpendicular magnetic recording medium according to claim 1, which has at least one soft magnetic layer between said nonmagnetic substrate and said nonmagnetic under layer.

10. A magnetic recording/reproducing apparatus comprising;

the perpendicular magnetic recording medium according to claim 1, a supporting and rotating driving mechanism of the perpendicular magnetic recording medium, a magnetic head having a device for recording information on said perpendicular magnetic recording medium and a device for reproducing the recorded information, and a carriage-assembly in which said magnetic head is supported freely movable relative to said perpendicular magnetic recording medium.

11. A magnetic recording/reproducing apparatus according to claim 10, wherein said read/write head is a single magnetic pole recording head.

* * * * *